UNITED STATES PATENT OFFICE.

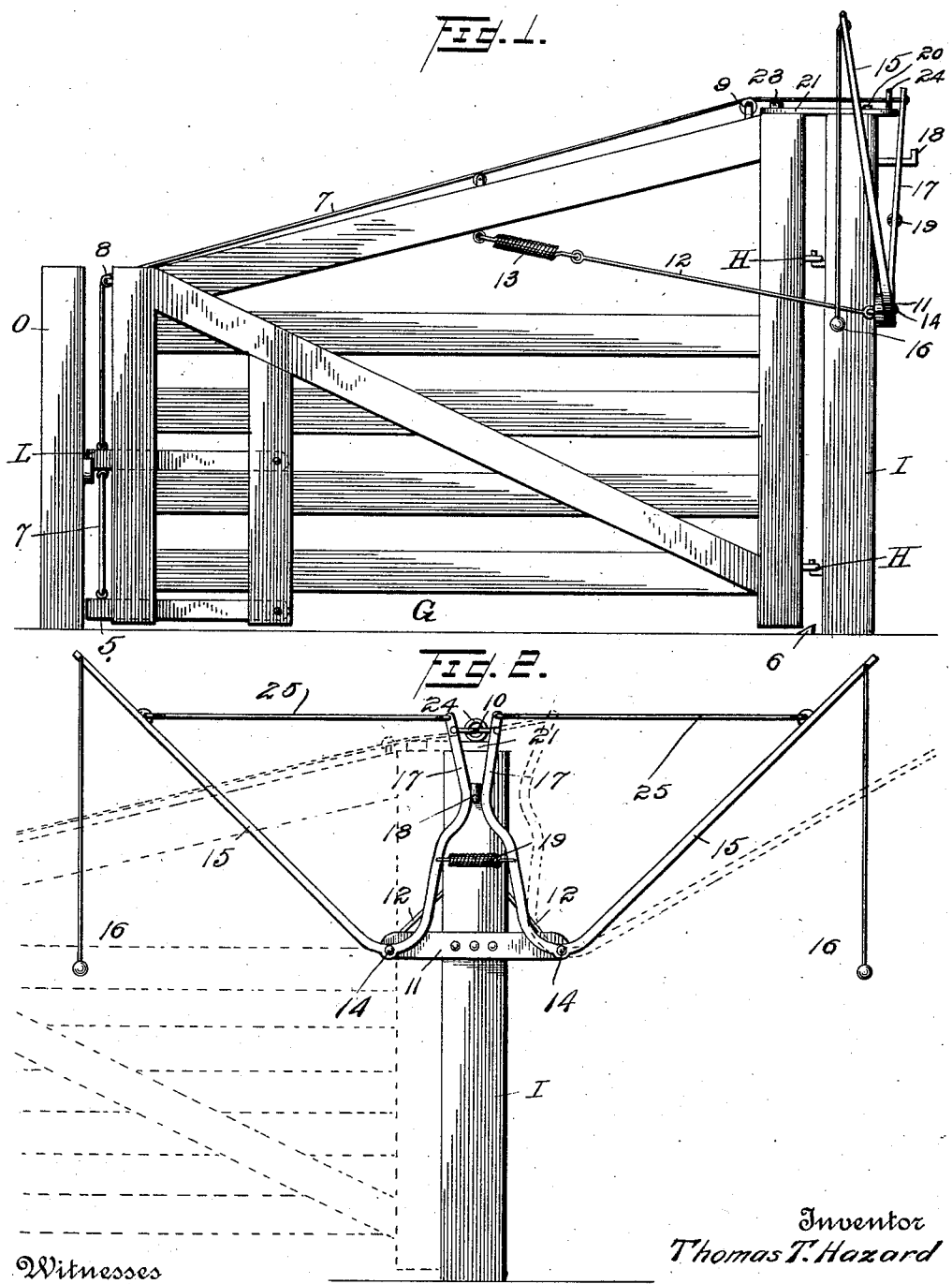

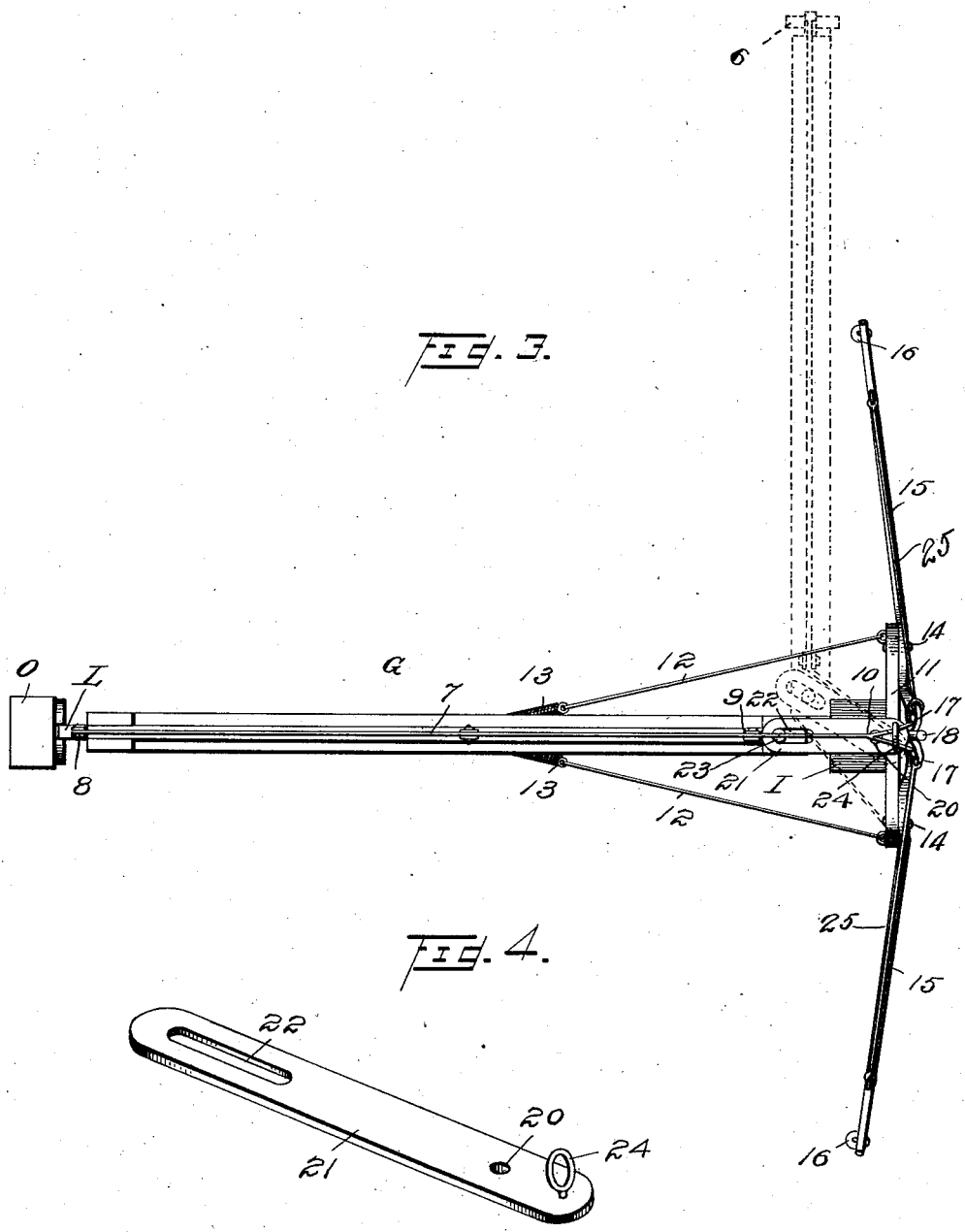

THOMAS T. HAZARD, OF ARROYO GRANDE, CALIFORNIA.

GATE-OPENER.

1,009,511.  Specification of Letters Patent.  Patented Nov. 21, 1911.

Application filed June 15, 1911.  Serial No. 633,359.

*To all whom it may concern:*

Be it known that I, THOMAS T. HAZARD, a citizen of the United States, residing at Arroyo Grande, in the county of San Luis Obispo and State of California, have invented certain new and useful Improvements in Gate-Openers; and I do declare the following to be a full, clear, and exact description of the invention, such as will enable others skilled in the art to which it appertains to make and use the same.

This invention relates to gates, and more especially to the opening devices therefor; and the object of the same is to produce an extremely simple device whereby a farm gate may be opened from either side by a person on foot or on horse back and caused to swing away from the person opening it; and may be latched either closed or opened. This and other objects are accomplished by the construction hereinafter more fully described and claimed, and as shown in the drawings wherein—

Figure 1 is a side elevation showing the gate closed; Fig. 2 is a rear view showing the gate partly open in dotted lines; Fig. 3 is a plan view the gate closed in full lines and open in dotted lines; Fig. 4 is a detail perspective view of the pivot plate enlarged.

In the drawings the letter G designates broadly a gate hinged as at H to the inner or hinge post I and adapted to be connected by a latch L with the outer or latch post O when the gate is closed, all these parts being of the usual or any preferred construction and forming no part of the present invention. I might here say that I preferably employ an additional latch 5 pivotally connected with the outer or swinging edge of the gate at a lower point than the main latch L and adapted to engage a keeper 6 mounted in the ground at either side of the gate and alongside the roadway, so that when the gate swings open this lower latch 5 engages one of said keepers and holds the gate open until it is tripped. A single cord or chain 7 leads from the lower latch upward past and is connected with the upper latch, thence over pulleys 8 and along the upper edge of the gate, over an additional pulley or through an eye 9 near the inner upper end of the gate, and is finally branched as at 10 for connection to my improved gate-operating mechanism which I will now describe.

The numeral 11 designates a cross bar secured across the back of the inner or hinge-post I at a point some distance beneath its upper end as shown, and to the extremities of this bar are connected rods, wires, or chains 12 which converge to their outer ends, the latter being connected by a contractile spring 13 with the gate so that whichever way the gate is swung open this spring is expanded, and its contractile tendency normally swings the gate closed again and latches it as at L. Pivoted as at 14 to the cross bar 11 near its opposite ends, are two like levers 15 having cords or handles 16 depending from their outer ends alongside the roadway so as to be within reach of an operator on horseback or on foot, and having their inner ends 17 turned upward on opposite sides of a stop pin 18 as best seen in Fig. 4 and connected by a contractile spring 19 whose tendency is to draw them normally toward each other so that they will stand against said pin as shown.

Pivoted at 20 to the top of the inner or hinge-post I is a plate 21 best seen in Fig. 5 and which has a slot 22 in its inner end moving freely over a pin 23 rising from the inner bar of the gate, so that whichever way this plate is swung upon its pivot 20 the slot 22 will carry the pin 22 to that side and swing the gate in that direction. Rising from the inner end of this plate is an eye or pulley 24 through which the branches 10 of the chain or cord 7 pass, whence they lead respectively to the upper ends of the inner portions 17 of said levers. Finally these inner ends may be connected with the outer ends or arms of the levers by wires or chains 25 so as to give the levers rigidity.

With this construction of parts, their operation is as follows: The gate standing closed as seen, the operator approaches and draws upon one of the cords or handles 16, this depresses the lever 15 which turns around its pivot 14 and its inner end 17 is drawn away from the stop pin 18 so as to expand the spring 19. This movement draws upon one of the branches 10 of the cord 7, and the tension is communicated over the rollers 9 and 8 to the latch L. The latter being raised, the gate is free to swing. Meanwhile the lateral movement of the inner end of this lever 17 draws the branch 10 to one side and this swings the eye or pulley 24 and causes the plate 21 to move upon its pivot 20. The effect of such movement of the plate is to cause its slot 22 to push the pin 23 on the gate, and force the latter to swing in a direction away from the operator as will be clear. Yet he may not need to swing the gate entirely open, especially if he be a pedestrian, and therefore he can draw on the cord or handle 16 only sufficiently to swing the gate enough to let him pass through. After his passage, whether the gate has been swung entirely open or only partly open but provided it has not been latched open, it will swing shut of its own accord on account of the contractile tendency of the spring 13. If, however, he requires to swing the gate entirely open as for instance for the passage of a load through it, he draws upon the cord or handle 16 to such an extent that the gate swings away from him and the lower latch 5 engages with the catch alongside the roadway. Thereafter, having passed through, he pulls upon the other cord or handle, and the inner end 17 of this lever draws upon the cord 7 and raises the latch 5 to disengage the gate from the catch 6, after which the contractile tendency of the spring 13 will normally close the gate and it will be latched closed as at L.

Thus it will be seen that I have produced a gate-operating mechanism by means of which an operator approaching from either side may swing the gate open as far as necessary, and cause it to swing from him so that his passage through the gateway is not impeded. If he swing it open only partway it returns and latches closed of its own volition. If he swing it completely open all that is necessary is for him to draw upon the opposite cord or handle 16 after he has passed through, to unlatch the gate from its catch 6, after which it will swing closed and latch of its own volition. Yet the parts of this mechanism are extremely few and very simple, and rarely get out of order.

I do not confine myself to the exact details further than as set forth below, nor to the sizes and proportions of parts; and considerable change may be made to suit the fancy of the manufacturer or user.

What is claimed as new is:

1. In a gate-operating mechanism, the combination with a gate hinged to a post, a latch on said gate, a latch-post with which it normally engages, and means for swinging the gate normally closed; of a cross bar secured to the rear of the hinge-post, a lever pivoted to each end of said cross bar and having its inner extremity upturned, a contractile spring connecting said extremities, a pin in the hinge-post between them, a cord leading from the gate-latch along its top and branched and having the extremities of its branches connected with the inner ends of said levers respectively, and gate-swinging mechanism connected with and moved by the lateral deflection of said branched cord.

2. In a gate operating mechanism, the combination with a gate hinged to a post, a latch on said gate, a latch-post with which it normally engages, and means for swinging the gate normally closed; of a cross bar secured to the rear of the hinge-post, a lever pivoted to each end of said cross bar and having its inner extremity upturned, a contractile spring connecting said extremities, a pin in the hinge-post between them, a plate pivoted to the upper end of said hinge-post and having a slot in its inner extremity, a pin in the gate loosely engaging said slot, an eye in the outer end of said plate, and a cord leading from the gate-latch along the top of the gate through said eye where it is branched and the extremities of the branches connected with the upper ends of the levers, substantially as described.

In testimony whereof I have hereunto set my hand in presence of two subscribing witnesses.

THOMAS T. HAZARD.

Witnesses:
ROBERT L. GOODIN,
ORRIN E. MILLER.